United States Patent [19]

Hussmann

[11] 4,345,917
[45] Aug. 24, 1982

[54] METHOD AND APPARATUS FOR RECOVERY OF WATER FROM THE ATMOSPHERE

[75] Inventor: Peter Hussmann, Munich, Fed. Rep. of Germany

[73] Assignee: Mittex Aktiengesellschaft, Liechtenstein, Liechtenstein

[21] Appl. No.: 276,244

[22] Filed: Jun. 22, 1981

Related U.S. Application Data

[63] Continuation of Ser. No. 18,698, Mar. 8, 1979, abandoned.

[30] Foreign Application Priority Data

Mar. 9, 1978 [DE] Fed. Rep. of Germany ....... 2810269

[51] Int. Cl.$^3$ .............................................. B01D 53/04
[52] U.S. Cl. .......................................... 55/33; 55/74; 55/208; 55/387
[58] Field of Search ......................... 55/33, 74, 80, 208, 55/267, 387, 31, 35, 179; 165/10, 80 B, 80 D, DIG. 4; 203/DIG. 1, 41, 49

[56] References Cited

U.S. PATENT DOCUMENTS

| | | | |
|---|---|---|---|
| 2,790,505 | 4/1957 | Dow | 55/33 |
| 3,230,689 | 1/1966 | Hussmann | 55/31 X |
| 3,263,400 | 8/1966 | Hoke et al. | 55/33 |
| 3,421,578 | 1/1969 | Marton | 165/80 B X |
| 3,981,698 | 9/1976 | Leppard | 55/31 |
| 4,030,896 | 6/1977 | Wimber et al. | 55/33 |
| 4,081,024 | 3/1978 | Rush et al. | 165/DIG. 4 |
| 4,146,372 | 3/1979 | Groth et al. | 55/33 |
| 4,183,734 | 1/1980 | Leppard et al. | 55/33 X |
| 4,185,969 | 1/1980 | Bulang | 55/31 |
| 4,285,702 | 8/1981 | Michel et al. | 55/33 |

FOREIGN PATENT DOCUMENTS

2624392 6/1975 Fed. Rep. of Germany .
2702701 7/1978 Fed. Rep. of Germany .......... 55/33

Primary Examiner—Robert H. Spitzer
Attorney, Agent, or Firm—Schwartz, Jeffery, Schwaab, Mack, Blumenthal & Koch

[57] ABSTRACT

Water recovery apparatus having a main heat reservoir and an adsorbent material, the apparatus operable in an adsorbent phase of operation for adsorption of water from the atmosphere into the adsorbent material using relatively humid, cool air and operable in a desorption phase of operation for the desorption of water therefrom using relatively drier, warmer air, the apparatus comprising an auxiliary heat reservoir, means for connecting the auxiliary heat reservoir in a first air flow path downstream of the main heat reservoir at the end of a desorption phase of operation, whereby said auxiliary heat reservoir stores energy from the main heat reservoir, and means for connecting the auxiliary heat reservoir in a second air flow path upstream of the main heat reservoir during the next succeeding desorption phase of operation whereby the auxiliary heat reservoir transfers heat energy stored therein to the air passing therethrough for pre-heating the air prior to passage through the adsorbent material and main heat reservoir.

36 Claims, 4 Drawing Figures

METHOD AND APPARATUS FOR RECOVERY OF WATER FROM THE ATMOSPHERE

This is a continuation of application Ser. No. 018,698, filed Mar. 8, 1979, now abandoned.

BACKGROUND OF THE INVENTION

1. Field of the Invention

The invention is in the field of recovery plants for the recovery of water from the atmosphere.

2. Description of the Prior Art

German Pat. Nos. P 26 60 068.0 and P 27 52 748.6, incorporated herein by reference, describe water recovery plants in which an adsorbent layer is preferably arranged directly above a heat reservoir. In this manner nighttime air for adsorbing water is passed first through the heat reservoir and then through the adsorbent layer, and subsequently daytime air for desorbing moisture is passed first through the adsorbent layer and then through the heat reservoir. If necessary, the daytime air can be heated by solar radiation up to a temperature beyond the temperature of the outdoor air. Preferably the daytime air is supplied without intermediate conduits from the heat reservoir to the adsorber and conversely from the adsorber to the heat reservoir. Reference is also made to copending applications of the same assignee as herein, namely Mittex Aktiengesselschaft, for "Process and System for Recovering Water from the Atmosphere", Ser. No. 781,890, filed Mar. 28,1977, now U.S. Pat. No. 4,146,372 ; for "Process and Plant for the Recovery of Water from Humid Air", Ser. No. 963,647, filed Nov. 24, 1978, now U.S. Pat. No. 4,219,341 ; and for "Silica Gel of Improved Properties and Process of Making Same", Ser. No. 747,474, filed Dec. 6, 1976, now U.S. Pat. No. 4,148,864 ,the whole of which applications being incorporated herein by reference.

Recovery plants using such processes compete with other water recovery processes, e.g., sea water desalination, in terms of expenditure of investment, maintenance and operation. Indeed, the expenditure for the recovery of 1 liter of water by the above-described plants is substantially less as compared with the sea water desalination. Nevertheless such plants are still at a level which makes the plants attractive primarily for supplying only drinking water in countries located, for example, in the tropics. However, capital outlays with such plants are still too high for large scale recovery of water for use in irrigating and cultivating large desert areas.

SUMMARY OF THE INVENTION

It is, therefore, an object of the present invention to improve these plants so that the cultivation of land in desert areas is made possible at a reasonable expenditure.

Therefore, the object of the invention is to provide a water recovery plant with the proper arrangement of structural components to be highly efficient and practical. For this purpose, the adsorber packages also serve as solar collectors, and an optimum utilization of the solar energy is possible whereby the yield of water from the adsorbent and from the heat storing mass is improved so that the water vapor content of the exhaust air leaving the heat reservoir during desorption is negligibly small and practically no water is left in the heat storing mass.

In accordance with the invention, there is provided a water recovery apparatus having a first or main heat reservoir and an adsorbent material. The apparatus is operable in an adsorption phase of operation for adsorption of water from the atmosphere into the adsorbent material using relatively humid, cool air (such as nighttime air, for example), and operable in a desorption phase of operation for the desorption of water from the adsorbent material using relatively dryer, warmer air (as, for example, daytime air). The apparatus comprises a second or auxiliary heat reservoir, means for connecting the auxiliary heat reservoir in a first air flow path downstream of the main heat reservoir at the end of a desorption phase of operation (and extending into the initial part of the adsorption phase, if desired) whereby the auxiliary heat reservoir stores heat energy from the main heat reservoir. The apparatus further comprises means for connecting the auxiliary heat reservoir in a second air flow path upstream of the main heat reservoir during the next succeeding desorption phase of operation whereby the auxiliary heat reservoir transfers energy stored therein to the air passing therethrough for preheating the air prior to passage through the main heat reservoir.

Thus, in accordance with the teachings of the invention there is described a method of increasing the efficiency of a water recovery apparatus having a main heat reservoir and an adsorbent material wherein the apparatus is operable in an adsorbent phase of operation for adsorption of water from the atmosphere into the adsorbent material using relatively humid, cool air and operable in a desorption phase of operation for the desorption of water from said adsorbent material using relatively dryer, warmer air, the method comprising the steps of: at the end of a desorption phase of operation, generating a first air flow path through the main heat reservoir, thence through the adsorbent material and thence through an auxiliary heat reservoir in order to transmit heat energy from the main heat reservoir to the auxiliary heat reservoir; and during the next succeeding desorption phase of operation, generating a second air flow path in the opposite direction of said first air flow path for preheating the air during the desorption phase of operation.

The object is achieved using blocks or slabs of concrete, but preferably of stone, as a heat reservoir or heat storing means with air flow gaps therebetween. Directly above the heat reservoir, solar collectors are disposed which also serve as adsorber packages. A second heat reservoir preferably of blocks or slabs arranged in the same manner as in the first heat reservoir is so arranged with respect to the first heat reservoir that the heat stored during the desorption phase by day in the first reservoir and the adsorbent is stored during a cold blowing phase as well as at the beginning of the following adsorption phase in the second heat reservoir from which it is supplied during the following desorption phase to the intake air of that phase before that air enters the adsorber package.

By this arrangement, the temperature of the desorption air is increased up to e.g. 80° C., in exceptional cases even up to 95° C., without the supply of outside energy, by the preheating in the second heat reservoir and by the better heating in the solar collector than it was hitherto possible in known collectors.

Thus one gets close to the range of the desorption temperatures of commercially available gels so that the expenditure for the gel used is substantially reduced.

Moreover the water vapor from the atmosphere is condensed almost completely in the small gaps of a width of 2 to 5 mm formed between the slabs or blocks on the smooth walls of these slabs or blocks so that during desorption the exhaust air leaves the reservoir free of portions of water vapor. Further, because of the perpendicular disposition of the gaps between the slabs or blocks water readily flows out of the reservoir. Thus the yield of water is increased by avoiding losses of portions of water vapor in the exhaust air and portions of water in the intermediate spacer between the heat storage material. As materials for the slabs or blocks one may preferably use stones occurring in the tropical countries, e.g., quartz based solid sandstone, lime sandstone, calcium-magnesium stone, e.g., dolomite, marble, basalt, granite, slate or mica. As a general characteristic, the slabs or blocks are made of a non-adsorbent, heat sink material of relatively high heat capacity.

To avoid water deposited on the upper edges of these slabs are inclined towards the air gap. The distances of the slabs relative to one another are insured by spacers having an obliquely downwardly inclined upper surface. Additionally, these spacers and if necessary further spacers may be disposed between the slabs for creating aerial vertices thereby improving heat transfer. An essential advantage of the new plant is seen in that the heat storage slabs are supported on support slabs or blocks spaced relative to one another and standing perpendicularly to their longitudinal direction. Thus a very costly bottom grid which is necessary otherwise for receiving granular or spherical heat storage material is superfluous. For the fixing of the slabs or blocks supporting the heat storage slabs or blocks they may be located in recesses formed in the base slab.

A specially simple manner of supporting the solar collectors, which are adsorber packages at the same time, is made possible by the fact that they can rest directly upon the upper edges of the heat storage slabs or blocks. An additional exploitation of solar energy is made possible by the fact that the slabs or blocks of the heat reservoir are colored black at least at their upper edges. An air filter absolutely necessary in desert areas may be dispensed with if stones or the like as filter material are filled into the channels formed by the inclination of the upper edges of the slabs or blocks of the second heat reservoir, which stones are preferably colored black. Advantageous structural dimensions of the plant are obtained if the base of the second heat reservoir is about 5-15% of the base of the first heat reservoir. Also an advantageous structural arrangement is obtained if the height of the slabs or blocks of the second heat reservoir is about 1½ to 3 times, but preferably twice the height of the slabs or blocks of the first heat reservoir. A very compact construction is obtained by the fact that one sidewall of the building receiving the first heat reservoir, preferably the north wall, constitutes the sidewall of the structured unit receiving the second heat reservoir.

To make the air flow communication between the two heat reservoirs possible, the air spaces above the two heat reservoirs are interconnected by an aperture in the intermediate wall disposed between them. Preferably a portion of the roof of the structural unit of the second heat reservoir, which portion is constructed as a flap, connects the air space above the first heat reservoir with the outside air in one end position of the flap and connects this air space with the air space above the second heat reservoir in its other end position. An essential improvement of the exploitation of the solar energy is achieved by the fact that the solar collectors are constructed of perforated aluminum plates of which one end is directed obliquely downwardly at a predetermined angle to the perforated bottom of the solar collector constituting the adsorber package at the same time, while the other end constitutes its upper cover and, if necessary, is directed zig-zag-like several times and its outer end is connected with the next sheet by welding or preferably beading.

Obviously the shape of the aluminum plates may be varied to suit the respective needs e.g. they may be made corrugated and receive the adsorbent in the troughs of the corrugations, a horizontal cover made of a perforated aluminum sheet being disposed thereabove. By superpositioning several such arrangements various types of gel may be positioned one on top of the other. A preferred embodiment of the perforated aluminum plates includes the use of so-called gill sheets in which the holes are made by punching such that they are confined by cross-pieces so that these cross-pieces project from the plane of the sheet, thereby improving the heat transfer or the reflection of the sun rays.

The angle of inclination of the sheets may have different values, e.g. 15, 30, 45 or even 60 to 70. To obtain a further improvement of the exploitation of solar energy the aluminum sheets or aluminum webs used in place thereof may be eloxadized (anodized) or provided with a selective tarnished black coating, e.g. on a lead-graphite basis. For the same purpose the solar collectors may be filled with silica gel spheres having a rough surface and a diameter of 5 to 11 mm or silica gel beads having a diameter of 1 to 5 mm or granulate gel of 1 to 7 mm. At least the upper layer of the gel is colored black and preferably aluminum powder is incorporated in the gels themselves or between the gel layers. For a further exploitation of solar energy solar collectors may rest upon the upper edges of the slabs or blocks of the second heat reservoir.

The operation of the plant for the recovery of heat from the first heat reservoir after the desorption phase is such that the exhaust air from the first heat reservoir is passed during a cold blowing phase following the desorption phase and, if necessary, at the beginning of the adsorption phase so long through the second heat reservoir until the temperature thereof is about equal to the temperature of said exhaust air and that in the subsequent desorption phase the inlet air for the adsorber for pre-heating it is passed through the second heat reservoir An automatic change-over of the air flow is achieved by the fact that the flap is operated automatically when the temperature of the exhaust air from the first heat reservoir is equal to the temperature of the storage mass of the second heat reservoir so that the air space above the first heat reservoir is connected with the outside air.

The operation of the deposition of the water on the adsorbent, preferably silica gel, and the recovery of water from the adsorbent is carried out by the fact that, in the desorption phase a fan draws in inlet air via an opening through the second heat reservoir, then through the adsorber package and thereafter through the first heat reservoir while in the adsorption phase it blows the inlet air from another opening in the opposite direction through the first heat reservoir and the adsorber package and thereafter, if necessary, through the second heat reservoir or again into the outside air.

BRIEF DESCRIPTION OF THE DRAWINGS

The invention is further described below in reference to the figures wherein.

DETAILED DESCRIPTION OF THE PREFERRED EMBODIMENT

Figure 1:
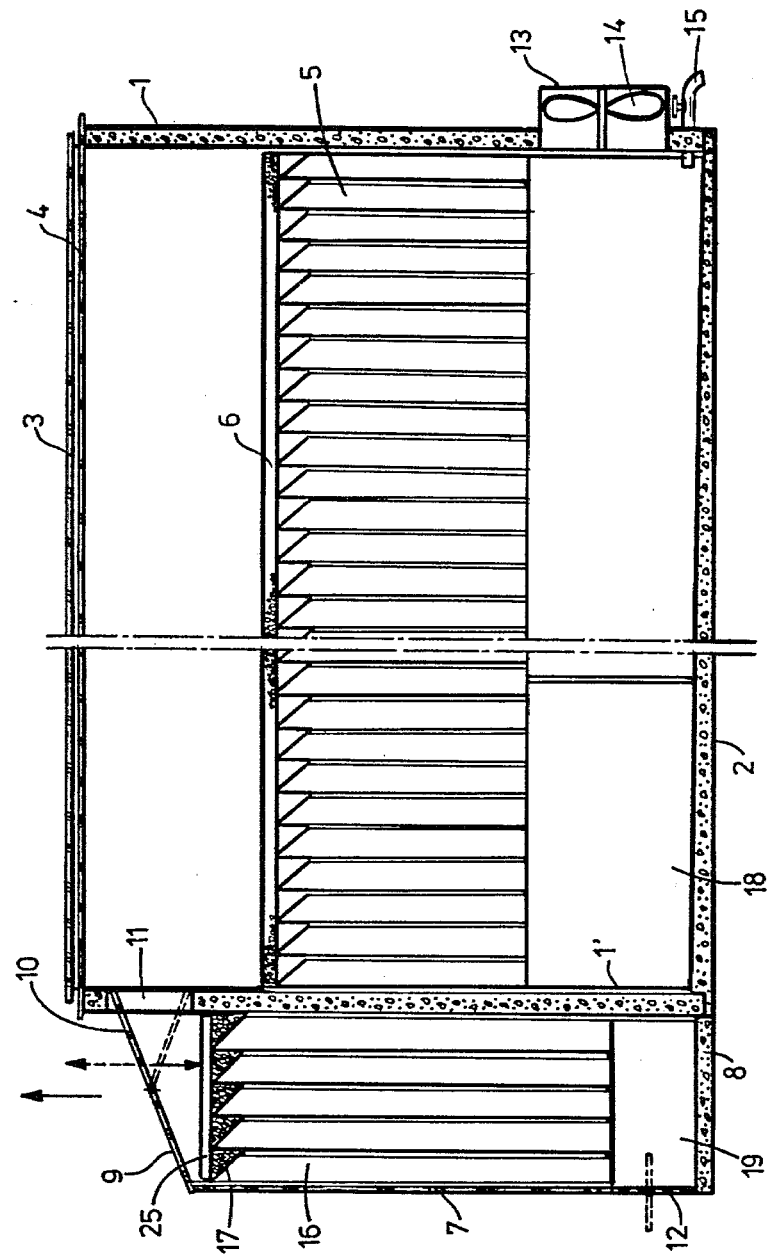
FIG. 1 is a cross-sectional view of a plant in accordance with the invention.

The first heat reservoir built of slabs 5 comprises a building having sidewalls 1, the base slab 2 and translucent roofs 3 and 4 made of glass, plastic plates or plastic sheets and arranged on top of one another with a space between them. The novel solar collectors 6 are supported on the upper edges of the slabs 5. The second heat reservoir consisting of the slabs 16 is arranged next to an intermediate sidewall 1' provided with an upper opening 11. The structural unit of this heat reservoir is formed of the base slab 8, a sidewall 7 which may be made of a translucent material, and a roof 9 which is translucent likewise. The opening 11 in the intermediate wall (common sidewall) 1' may selectively connect by means of the flap 10 the air space above the first heat reservoir with either the air space above the second heat reservoir or with the outside air. A fan 14 for the flow of air is arranged in an opening 13 in the other sidewall 1, below which is a water outlet pipe 15 for the water collected on the said base 2 during the desorption phase. In the channels 17 between the slabs 16 of the second heat reservoir there is arranged a filter material such as stone. The inlet air enters the second heat reservoir in the desorption phase through an opening 12 in the sidewall 7, which is provided with a flap. By means of a dotted line and an arrow in the upper part of the second heat reservoir the second end position of the flap 10 and the direction of the entering air are indicated. Solar collectors 25 which may be of conventional design and which do not contain a water adsorbent material are positioned on top of the slabs 16 of the second heat reservoir.

Figure 2:
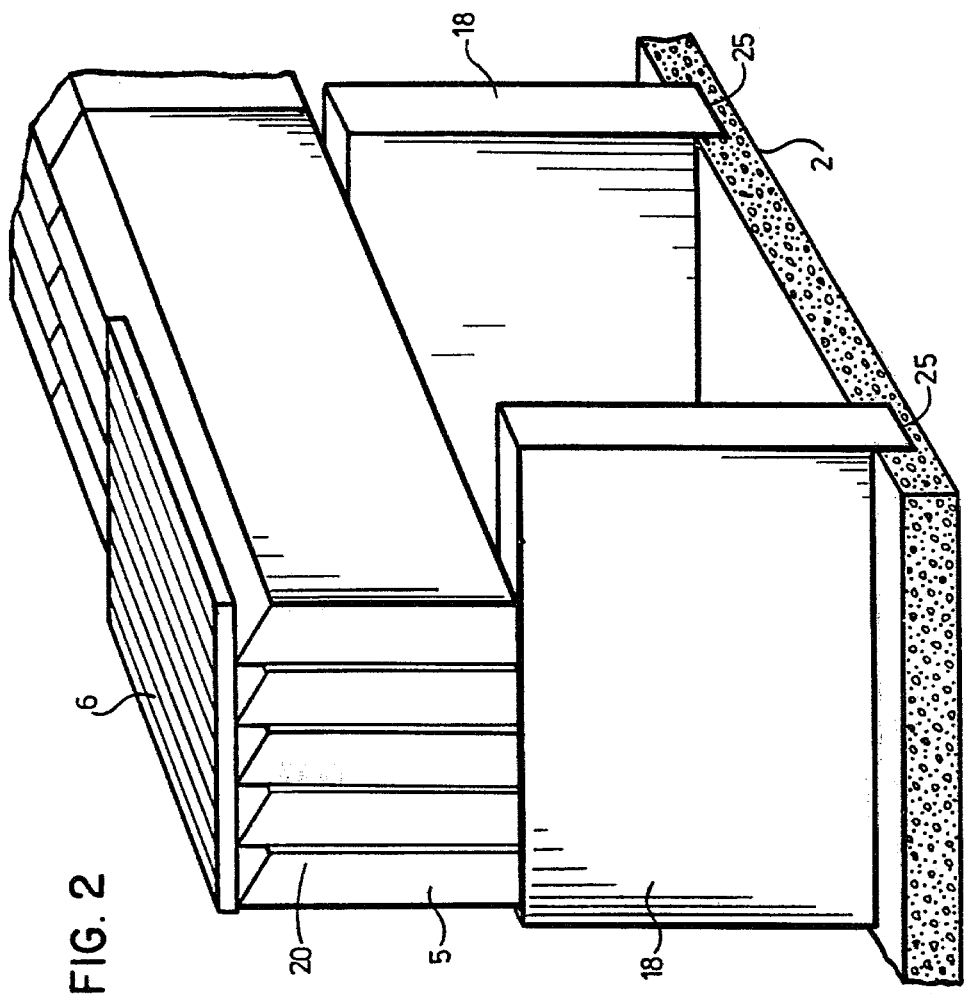
FIG. 2 shows a perspective, exploded view of the construction of a first heat reservoir in accordance with the invention.
Figure 3:
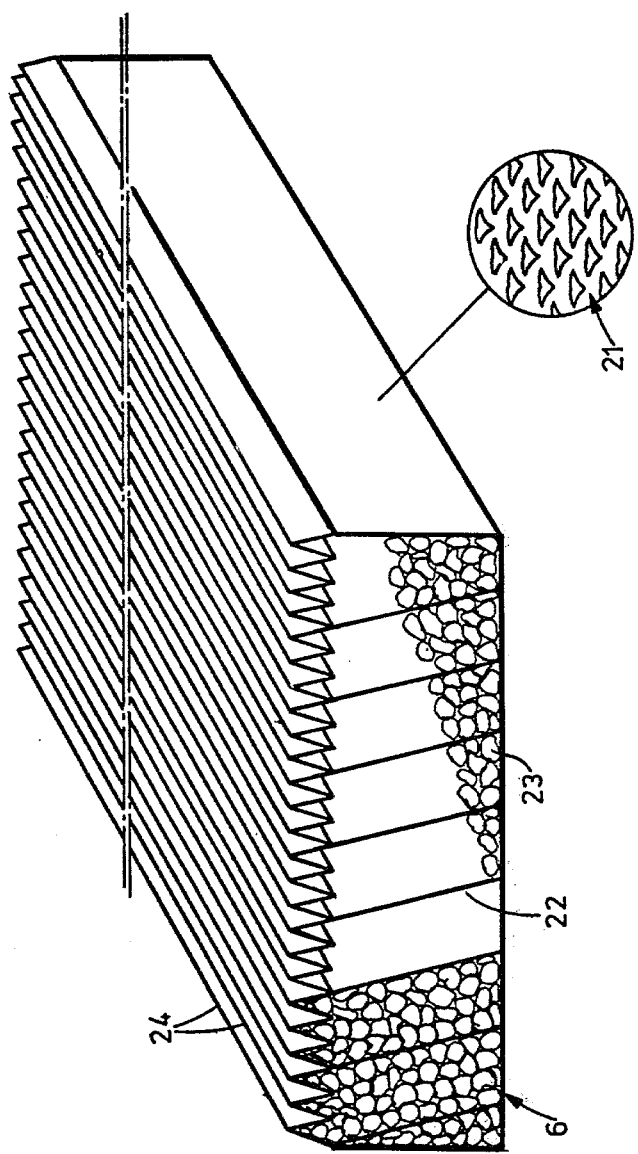
FIG. 3 illustrates a solar collector utilized in the plant of FIG. 1.
Figure 4:
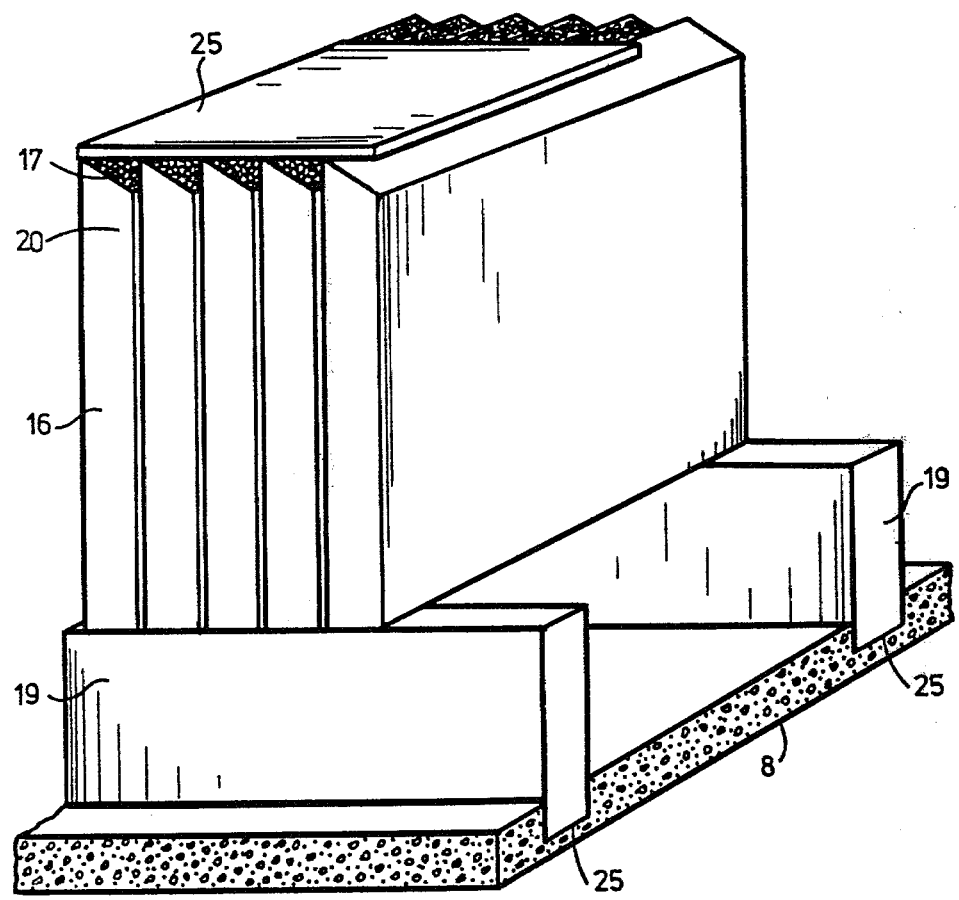
FIG. 4 shows a perspective, exploded view of the construction of a second heat reservoir in accordance with the invention.

FIG. 2 shows supporting slabs or blocks 18 which are mounted in recesses 25 formed in the base slab 2, upon which the slabs 5 of the first heat reservoir with air gaps 20 between them are arranged. A similar utilization of supporting blocks 19 is employed for slabs 16. A solar collector 6 is positioned on top of slabs 5, the constructional embodiment of which is shown in a larger scale from FIG. 3. The gill sheet used as a perforated sheet is illustrated at 21. One end 22 of each perforated sheet runs through the silica gel layer 23 to the bottom of the adsorber package in an inclined downward direction while the other end forms the zig-zag-shaped cover 24 and is connected with the next sheet e.g. by welding or beading.

Preferred structural dimensions of the slabs of the heat reservoir, which may be covered with a synthetic resin or silicone coating, are a thickness of 100 to 200 mm and distances of the slabs from one another of 3 to 10 mm. The height of the slabs of the first heat reservoir may be 800 mm and of the second 1600 mm. Slabs of a value of 20 cbm may be used.

The specific weight of the stones used is on an average 2.8 although it is about 25% lower than that of concrete of 0.25 as compared with that of the stones of 0.21 is equalized since the heat conductivity of concrete amounts to only about 1.1 while that of the stones lies between 2 to 3.5.

The sheets used for the solar collectors have a thickness of preferably 0.5 to 1 mm, the width of the holes amounts to 1 to 5 mm, the distances of the sheet portions projecting into the silica gel layer amount to 20 to 30 mm, the height of the adsorber package amounts to 60 to 70 mm. Altogether the weight of the aluminum sheets per sqm should amount to 4 to 12 kg in order to obtain an optimum exploitation of solar energy.

By means of the second heat reservoir about 20 to 50% of the solar collector area may be dispensed with or the yield of water may be increased by about 50%. The desorption air is preheated in the second heat reservoir to about 50° C. and in the solar collector to 80° C. in exceptional cases to 95° C.

In operating the plant in accordance with the invention it is desirable to recover and store the heat which has accumulated in slabs 5 during the desorption (daytime) phase of operation. At the end of the desorption phase there is an intermediate period or phase in which the ambient temperatures are intermediate between the nominal daytime and nighttime temperatures. This intermediate phase may be termed a "cold blowing" phase wherein generally only a small amount of adsorption occurs. During the cold blowing phase, air is drawn from fan 14 into opening 13, through the slabs 5 which have been heated due to the warm air, daytime operation in the just completed desorption phase. Air from slabs 5 is then passed through the adsorbent material and through slabs 16 of the second or auxiliary heat reservoir, exiting the plant through opening 12. In this mode of operation, the flap 10 is in the position shown by the solid line of FIG. 1. After the temperature of the slabs 16 reach the temperature of the air passing therethrough, flap 10 is placed into the position shown by the dotted line, and the air from the main or first heat reservoir is exhausted to the outside air without passing through the second heat reservoir. As a consequence, the cold blowing phase transfers the heat from the first heat reservoir to the second heat reservoir.

Following the cold blowing phase, the air path is maintained by fan 14 to draw air into opening 13, through slabs 5 and the adsorbent material 6 and through the outside opening adjacent flap 10.

During the next succeeding desorption phase, flap 10 is placed in the position shown by the solid line thereby connecting the air spaces above the first and second heat reservoirs. Fan 14 is then reversed to draw air into opening 12 through slabs 16 of the second heat reservoir, through solar collectors 25, through opening 11 of the common side wall 1', silica gel 6, slabs 5 and outside through opening 13. In this manner, ambient air is preheated by the second heat reservoir during the desorption phase of operation. The preheating of the ambient air is particularly important during the initial period of the desorption phase because ambient temperatures are just beginning to be warm during the early portion of the day. The preheating of the ambient air thus increases plant operating efficiency and utilizes the heat accumulated in the first heat reservoir during the desorption phase.

While the present invention has been described with regard to a particular embodiment, modifications may readily be made by those skilled in the art, and it is intended that the claims cover any such modifications which fall within the spirit and scope of the invention.

What is claimed is:

1. A method of recovering water from air utilizing a main and an auxiliary heat reservoir comprising the steps of:
   (a) during a desorption phase of operation:
      (1) passing relatively dry, warm air through said auxiliary heat reservoir for preheating said air,
      (2) subsequently passing said relatively dry, warm air through an adsorbent material for adsorption of moisture from said adsorbent material into said relatively dry, warm air
      (3) then, passing said relatively warm air having moisture from said adsorbent material through said main heat reservoir, and
      (4) condensing said moisture removed from said adsorbent material in said main heat reservoir, said main heat reservoir taking up heat of condensation in condensing said moisture,
   (b) during a cold blowing phase of operation subsequent to said desorption phase:
      (1) passing relatively cool air through said main heat reservoir for picking up at least a portion of said heat of condensation,
      (2) passing said relatively cool air containing said heat of condensation through said adsorbent material and through said auxiliary heat reservoir for depositing said heat of condensation in said auxiliary heat reservoir,
   (c) during an adsorption phase of operation:
      (1) passing relatively humid, cool air through said main heat reservoir, and
      (2) subsequently passing said air from said main heat reservoir through said adsorbent material for adsorption of moisture from said air into said adsorbent material, and
   (d) repeating said steps (a), (b) and (c) whereby moisture is adsorbed from humid, cool air by said adsorbent material during said adsorption phase of operation, moisture is picked up from said adsorbent material and condensed in said main heat reservoir during said desorption phase of operation, and heat of condensation is transmitted from said main heat reservoir to said auxiliary heat reservoir during said cold blowing phase of operation.

2. A method as recited in claim 1, wherein said cold blowing phase of operation continues until the temperature of said air entering said auxiliary heat reservoir is substantially the same as the temperature of said auxiliary heat reservoir, at which time, prior to, said adsorption phase of operation said method includes the step of diverting said air after passage through said adsorbent material for exhausting same to the outside air without passage through said auxiliary heat reservoir.

3. A method as recited in claim 2 wherein said diverting step is continued for operation of said adsorption phase and prior to the next succeeding desorption phase.

4. A water recovery apparatus comprising:
   (a) a main heat reservoir,
   (b) a region of adsorbent material adjacent to said main heat reservoir for adsorption of moisture from relatively humid, cool air and for desorption of moisture therefrom into relatively dry, warm air,
   (c) an auxiliary heat reservoir spacedly positioned from the region of adsorbent material and away from said main heat reservoir,
   (d) means for generating a first air flow path during a desorption phase of operation through said auxiliary heat reservoir, then through said adsorbent material and subsequently through said main heat reservoir for passing relatively dry, warm air through said region of adsorbent material so that said relatively dry, warm air takes up moisture from said adsorbent material and condenses same in said main heat reservoir, said main heat reservoir taking up heat of condensation in condensing said moisture,
   (e) means for generating a second air flow path during a cold blowing phase of operation through said main heat reservoir, then through said region of adsorbent material and then through said auxiliary heat reservoir for passing relatively cool air through said main heat reservoir for picking up at least a portion of said heat of condensation and transferring same to said auxiliary heat reservoir,
   (f) means for generating a third air flow path during an adsorption phase of operation through said main heat reservoir, then through said region of adsorbent material for cooling said main heat reservoir and for passing relatively humid, cool air through said region of adsorbent material so that said adsorbent material picks up moisture from said relatively humid, cool air
   whereby moisture is adsorbed from said humid, cool air by said adsorbent material during said adsorption phase, moisture is picked up from said adsorbent material and condensed in said main heat reservoir during said desorption phase of operation and heat of condensation is transmitted from said main heat reservoir to said auxiliary heat reservoir during said cold blowing phase of operation.

5. Apparatus as recited in claim 4 wherein said main heat reservoir comprises a plurality of slabs of non-adsorbent, heat sinc material having a relatively high heat capacity.

6. Apparatus as recited in claim 5 wherein said plurality of slabs of said main heat reservoir comprise concrete.

7. Apparatus as recited in claim 5 wherein said plurality of slabs of said main heat reservoir comprise stone material.

8. Apparatus as recited in claim 7 wherein said stone material is selected from the group of quartz base solid sandstone, lime sandstone and calcium-magnesium stone.

9. Apparatus as recited in claim 5 wherein said slabs of said main heat reservoir are arranged in a generally vertical direction parallel to one another and spaced apart whereby air passages are provided between adjacent slabs.

10. Apparatus as recited in claim 9 wherein said region of adsorbent material is disposed directly above said slabs.

11. Apparatus as recited in claim 10 further comprising means for collecting solar radiation, said collecting means positioned at least above said region of adsorbent material.

12. Apparatus as recited in claim 11 wherein said solar collecting means are formed of perforated aluminum plates whose one end is directed at a predetermined angle obliquely downwardly to a perforated bottom of the solar collecting means while the other end forms its upper cover and is shaped in a zig-zag-like manner.

13. Apparatus as recited in claim 12 wherein said peforated aluminum plates have a grill-like hole pattern so that holes confined by crosspieces are produced.

14. Apparatus as recited in claim 12 wherein the angles of inclination of the plates are selected from the group consisting of 15°, 30°, 45° and 60°–70°.

15. Apparatus as recited in claim 12 wherein the perforated aluminum plates are eloxadized or provided with a selected tarnished black coating, e.g. a lead-graphite basis.

16. Apparatus as recited in claim 11 wherein silica gel spheres having a rough surface and a diameter of 5 to 11 mm or bead gel of 1 to 5 mm or granulated gel of 1 to 7 mm are filled into the solar collecting means and that at least the upper layer of the gel is colored black.

17. Apparatus as recited in claim 9 wherein said auxiliary heat reservoir comprises a plurality of auxiliary slabs of non-adsorbent, heat-sinc material having a relatively high heat capacity.

18. Apparatus as recited in claim 17 wherein said plurality of auxiliary slabs are arranged in a generally vertical direction parallel to one another and spaced apart whereby air passages are provided between adjacent slabs.

19. Apparatus as recited in claim 18 wherein said plurality of auxiliary slabs are supported on auxiliary supporting blocks spaced relative to one another and extending perpendicular to the longitudinal direction of said plurality of auxiliary slabs.

20. Apparatus as recited in claim 18 wherein the vertical dimension of said auxiliary slabs is approximately twice the vertical dimension of said slabs of said main heat reservoir.

21. Apparatus as recited in claim 18 wherein auxiliary solar collecting means are disposed on said plurality of auxiliary slabs.

22. Apparatus as recited in claim 9 wherein said plurality of auxiliary slabs comprise concrete.

23. Apparatus as recited in claim 9 wherein said plurality of auxiliary slabs comprise stone material.

24. Apparatus as recited in claim 23 wherein said stone material is selected from the group of quartz base solid sandstone, lime sandstone and calcium-magnesium stone.

25. Apparatus as recited in claim 9 wherein upper edges of said plurality of slabs of said main heat reservoir are inclined toward the air passages therebetween.

26. Apparatus as recited in claim 9 wherein said plurality of slabs are supported on supporting blocks spaced relative to one another and extending perpendicular to the longitudinal direction of said slabs.

27. Apparatus as recited in claim 26 or 19 further comprising a generally horizontal main base slab below said supporting blocks in a generally horizontal auxiliary base slab below said auxiliary supporting blocks, said supporting blocks positioned in recesses of said base slab, and said auxiliary supporting blocks positioned in recesses of said auxiliary base slab.

28. Apparatus as recited in claim 27 wherein said auxiliary base slab is approximately 10% of the area of said main base slab.

29. Apparatus as recited in claim 4 wherein upper edges of said plurality of auxiliary slabs are inclined towards the air passages therebetween.

30. Apparatus as recited in claim 29 wherein the region between adjacent ones of said plurality of auxiliary slabs contain stones.

31. Apparatus as recited in claim 30 wherein said stones are colored black.

32. Apparatus as recited in claim 29 or 25 wherein spaces are provided between said air passages for generating air vortecis.

33. Apparatus as recited in claim 4 wherein said main and auxiliary heat reservoirs are positioned adjacent one another separated by a common sidewall.

34. Apparatus as recited in claim 33 wherein said main and auxiliary heat reservoirs are positioned with a roof thereabove, and wherein the air space above said main and auxiliary heat reservoirs are connected by an opening in said common sidewall.

35. Apparatus as recited in claim 34 wherein said means for connecting said auxiliary heat reservoir in said first and second air flow paths comprises a flap forming part of the roof above said auxiliary heat reservoir.

36. Apparatus as recited in claim 35 wherein one position of said flap connects the air space above said main and auxiliary heat reservoirs, and a second position of said flap connects the main heat reservoir directly with the outside air.

* * * * *